United States Patent [19]

Doman

[11] 4,073,600
[45] Feb. 14, 1978

[54] DAMPING MECHANISM FOR THE ROTOR HUB OF A HELICOPTER FOR GROUND RESONANCE AND WADDLE AND ITS COMBINATION WITH THE ROTOR

[75] Inventor: Glidden S. Doman, West Chester, Pa.

[73] Assignee: William Gallagher, West Chester, Pa.

[21] Appl. No.: 695,737

[22] Filed: June 14, 1976

[51] Int. Cl.² .......................................... B64C 27/52
[52] U.S. Cl. .................................. 416/140; 416/148
[58] Field of Search .................. 416/102, 107, 140 A, 416/148, 131, 138, 141, 500; 244/17.11, 17.13, 17.25

[56] References Cited

U.S. PATENT DOCUMENTS

| 2,173,291 | 9/1939 | Ash .................................. 416/88 X |
| 2,550,538 | 4/1951 | Doman .............................. 244/17.13 |
| 2,677,429 | 5/1954 | Laufer ........................... 416/140 A X |
| 2,687,856 | 8/1954 | Doman .............................. 244/17.13 |
| 2,861,640 | 11/1958 | DuPont ................................ 416/50 |
| 3,288,227 | 11/1966 | Derschmidt ..................... 416/500 X |
| 3,477,665 | 11/1969 | Legrand .......................... 416/500 X |
| 3,960,348 | 6/1976 | Fowler et al. ................. 244/17.13 X |
| 4,004,757 | 1/1977 | Doman ............................ 416/500 X |

FOREIGN PATENT DOCUMENTS 1,393,416   2/1965   France ............................. 244/17.13

*Primary Examiner*—Everette A. Powell, Jr.
*Attorney, Agent, or Firm*—John M. Montstream

[57] ABSTRACT

A damping mechanism is disclosed for damping the oscillations of the rotor hub which are coupled with periodic motions of the fuselage when on the ground, known as ground resonance, and a waddle when in the air. The rotor includes a freely tiltable rotor head mounted on a non-rotatable universal joint having an outer gimbal ring and an inner ring carried by a pylon. The damping mechanism connected between a gimbal ring and the pylon combines the action of a fluid dashpot in tandem with spring means the output of which is connected into the linkage between the pilot stick and the swash plate. The tandem combination of dash pot and spring means delays the signal to the swash plate by about 90° to insert a corrective movement into the swash plate with feathering of the blades to tilt the rotor thrust vector which damps the oscillations of the rotor hub. The invention includes the damping mechanism per se and its combination with the rotor and with the swash plate.

18 Claims, 3 Drawing Figures

DAMPING MECHANISM FOR THE ROTOR HUB OF A HELICOPTER FOR GROUND RESONANCE AND WADDLE AND ITS COMBINATION WITH THE ROTOR

Figure 3:
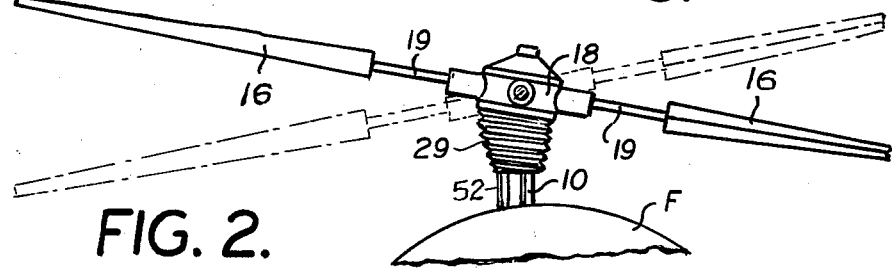

The Doman type of rotor as described in U.S. Pat. No. 3,007,654 includes among other things a rotating rotor which comprises a rotating rotor head with its hub and blades which head is mounted on a non-rotating universal or gimbal joint. The head is free floating in that it can assume any tilt or angular position, within limits, with respect to the pylon and uses a flexible spar for mounting the body of each blade on the rotor hub. As a consequence of blade spar flexibility and freedom of tilt of the rotor head and its hub, the latter can develop an aeromechanical instability involving blade oscillation in the plane of rotation of the blades represented by the tip path as shown in FIG. 3 which will be typically one half or less than one half of the rotor revolutions per minute and depends on the helicopter design parameters. This oscillation is accompanied by angular motion of the rotor disc relative to the fuselage which motion is principally laterally with respect to the longitudinal axis of the fuselage with the result that a corrective control signal can be derived from the motion described. The common terms for these aeromechanical instabilities are "ground resonance" or vibration of the fuselage when on the ground and a "waddle" motion or vibration when in flight. These two vibrations are at the same frequency as the rotor hub oscillations seen in the non-rotating system which is typically about one half or less than one half of the rotor revolutions per minute.

Dampers between fuselage and landing gear is presently one expedient for reducing or control of such vibrations, as well as control of the stiffness of the landing gear and helicopter structure and blade lag dampers.

An object of the invention is to construct a damping mechanism for a helicopter having a free floating rotor head mounted on a non-rotating gimbal joint and having flexible blade spars which mechanism reduces or eliminates oscillations of the rotor hub with respect to the plane of rotation of the blades and thereby reduce or eliminate ground resonance and waddle vibrations of the fuselage.

Another object of the invention is to construct a damping mechanism for the hub of the rotor of the type having flexible spars for the blades and a free floating head mounted on a non-rotating gimbal or universal joint which creates and inputs a corrective control signal which damps the oscillations of the hub and eliminates or substantially reduces the ground resonance and waddle motion of the fuselage.

Another object is to construct a damping mechanism as above which combines the action of a fluid damper and of spring means and is connected to one of the gimbal rings of the universal or gimbal joint which mounts the rotor head at a point laterally of the fuselage axis and head which damper has a fluid connection with a fluid actuator connected with the swash plate in parallel with, or directly in the linkage between the pilot stick and the swash plate or between the stick and a servo motor which is connected with the swash plate.

Another object is to construct a free floating rotor for a helicopter having a rotor hub rotatably mounted on a non-rotatable outer gimbal ring and a flexible spar mounting each of the blades on the hub with a fluid damping mechanism connected between a ring of the gimbal and a fixed point on the aircraft which obtains a dashpot phased fluid pressure from periodic movements of the hub and is connected laterally of the gimbal ring with respect to the fuselage axis and which mechanism is connected with a sring restrained fluid actuator which is connected with the swash plate to insert a corrective increment into the swash plate movement and rotor blades and thereby tilt the rotor thrust vector to damp out the hub oscillations.

Figure 1:
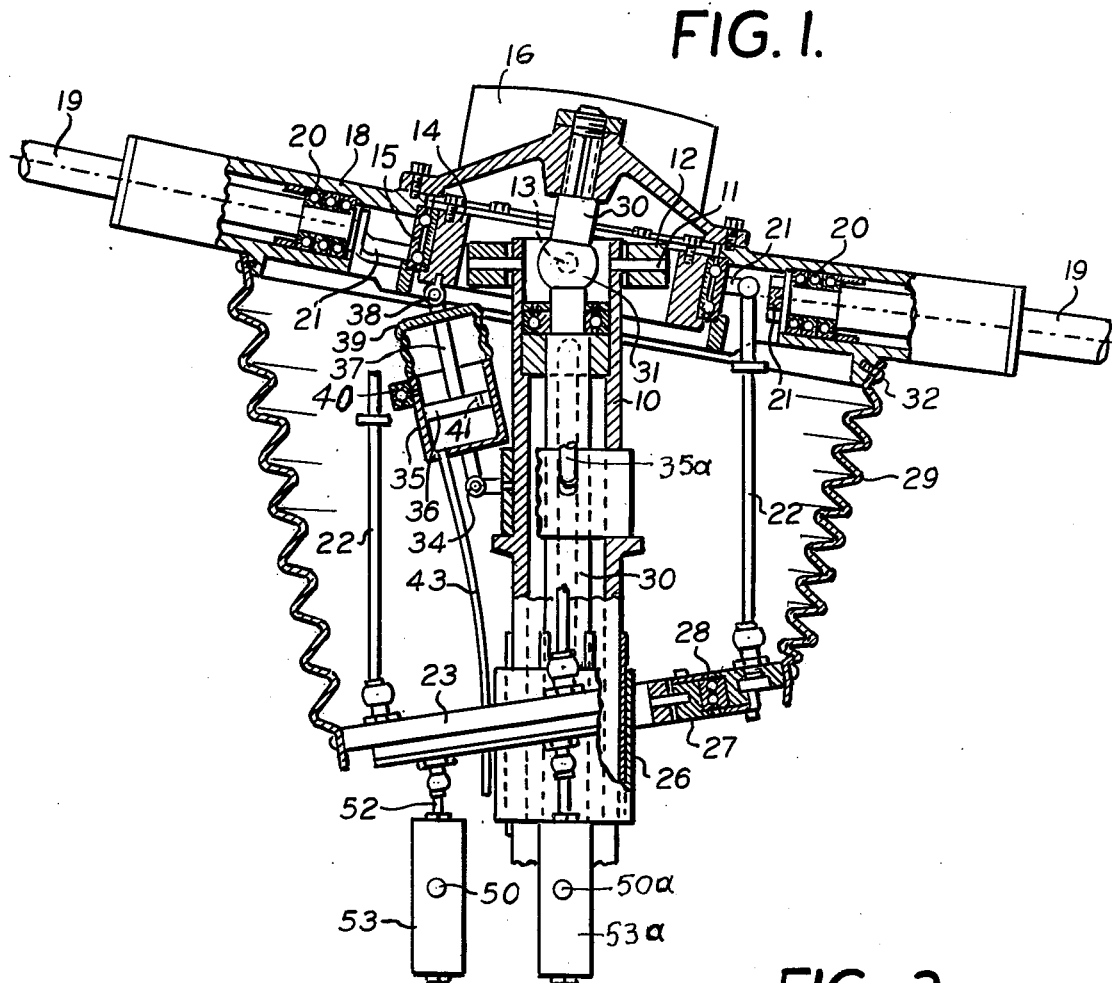
Figure 2:
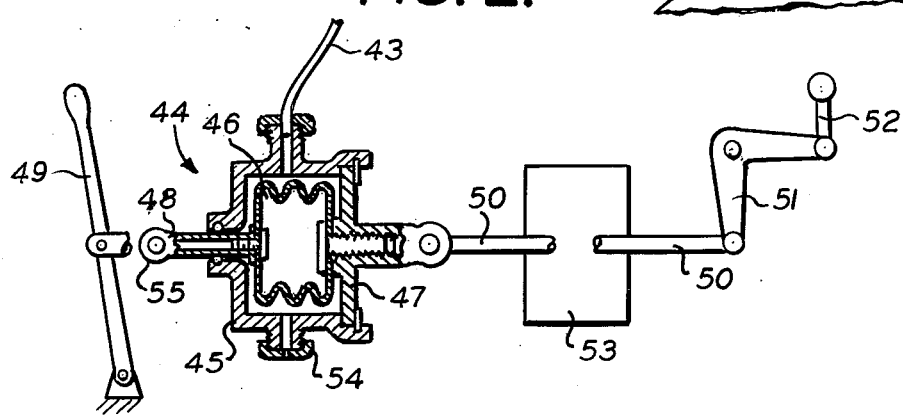

Other objects of the invention will be more apparent from the following description when taken in connection with the accompanying drawing illustrating a preferred embodiment thereof in which, FIG. 1 is a partial view of a rotor with the damping mechanism connected with a ring of the non-rotatable gimbal, FIG. 2 is a sectional view of the fluid actuator portion of the damping connected with the swash plate, FIG. 3 shows the hub oscillation and the tilting motion of the rotor disc with respect to the fuselage pylon.

The helicopter includes a fuselage F having a longitudinal axis which fuselage carries a fixed pylon 10 to the end of which carries a rotor gimbal or universal joint having a lateral pivot means 11 carried by the pylon and on which is mounted an inner gimbal ring 12 which is free to tilt on the pivot means. The inner gimbal ring has fore and aft pivot means 13 located 90° from the pivot means 11 on which is mounted an outer gimbal ring 14. With these two pivot means the outer gimbal ring is non-rotatable and free to tilt at any angle with respect to the pylon. A circular bearing 15 is carried by the ring 14 with its axis corresponding with the axis of the pylon. If desired the pivot means 11 between the pylon and the inner ring 12 may be located fore and aft and the pivot means 13 between the inner ring and the outer ring may be located laterally.

A rotor head is rotatably mounted on the bearing 15 and includes a rotor hub 18 with a plurality of blades 16 uniformly spaced angularly from each other and extending outwardly therefrom which blades have flexible spars 19. Each blade and spar is oscillatable on its longitudinal axis in blade bearings 20. Each blade has a horn 21 secured to the inner end of the spar which extends around the pylon axis for about 90° where it is connected by a rod 22 to a swash plate 23. Because of the gimbal joint mounting the rotor head is free to tilt angularly with respect to the pylon at any angle within limits. The rotor head shown has four blades.

The swash plate is carried on a sleeve 26 which is slidable on the pylon 10 for collective pitch change of the blades. The swash plate is rotatably mounted on a universal joint in known manner which joint has an outer ring 27 which carries a bearing 28 for rotatably mounting the swash plate. The universal joint permits the swash plate to be tilted for cyclic pitch change of the blades as they rotate. The swash plate is driven at the same speed as the rotor, such as through a flexible boot 29 secured thereto and secured to the rotating rotor hub by screws 32. The rotor head and its hub 13 is driven through a suitable connection by the drive shaft 30 and a universal joint 31 forming a part of the drive shaft which shaft is mounted within the pylon 10. The center axis of the shaft universal joint 31 and of the rotor gimbal joint are the same. A suitable gear reduction unit (not shown) may be and preferably is connected between the stub of the drive shaft 30 above the joint 31 and the rotor hub 18 as described in the above identified Doman patent.

The damping mechanism includes a combined dashpot and spring or resilient restraining means which creates a suitably corrective control signal in response to motions which occur between the outer gimbal ring 14 of the rotor gimbal joint at a point laterally of the longitudinal axis of the helicopter or fuselage, and its other end which is secured to fixed structure of the aircraft such as the pylon 10 by a ball and socket connection 34. The fluid damper provides a dashpot-phased fluid pressure signal and includes a cylinder 35 having an open end and a piston 36 slidable therein dividing the cylinder into two chambers. The piston has a piston rod 37 secured at one end to the piston and the other end has means to secure the same to the outer gimbal ring 14 such as by a ball and socket connection 38 or its equivalent. The dashpot-phased fluid pressure signal at the outlet 43 of the dashpot is obtained from the oscillation of the rotor gimbal ring and the dash pot piston in conjunction with the passage of fluid through the orifice 41. A high pressure bleed valve 40 is provided for the end of the cylinder closed by spring means 39 in order that the system may be purged of air from a point in the control system below the assembly shown in FIG. 1. The damping control signal provided by the fluid cylinder and piston may be secured by a suitably loose fit of the piston in the cylinder or may be adjusted or secured by a restricted orifice 41 in the piston or both.

The damper cylinder has a fluid connection 43 with a spring-centered actuator or sylphon 44 which includes a casing or cylinder 45. Actuator piston means is provided within this cylinder including a flexible or resilient cylindrical piston 46 and an actuator piston rod 48. One end of the piston is secured to the cylinder such as the head 47 thereof and the other end is secured to the actuator piston rod. The actuator may be connected in parallel or series with the linkage between the pilot stick 49 and the swash plate. The connection shown is in series or forming a part of the linkage between the pilot stick and the swash plate. The actuator cylinder is suitably connected such as through a linkage including rod 50 and bell crank 51 to push rod 52 of the swash plate 23 at a lateral position thereof relatively to the longitudinal axis of the helicopter or swash plate. For a parallel connection the attaching means 55 is secured to the fuselage and a mixing connection is provided between the attaching means 56 and the rod 50. The actuator or sylphon is preferably connected with a servo-mechanism 53 which in turn is connected with the push rod 52 of the swash plate. A high pressure bleed valve 54 connected with the cylinder 45 provides a relief outlet should the pressure therein become excessive. The sylphon 44 is air tight and has a spring rate low enough so that its intended full stroke will not involve fluid line pressures below atmospheric so as to avoid drawing air into the line which would create a spring effect by the air which would increase signal lag.

The damper mechanism is illustrated particularly as extending between the outer gimbal ring 14 and the pylon 10 because the lateral gimbal pivot 11 is between the pylon and the inner gimbal ring 12. If the rotor gimbal joint has its lateral pivot between the inner gimbal ring 12 and the outer gimbal ring 14 so that the fore and aft pivot means 13 is between the pylon and the inner ring 12, then the lateral damper means may be connected between the inner or outer gimbal ring and the pylon.

The damping mechanism described adjusts itself to a plane of zero restraint, that is, if the rotor and hub tilts such as because of some flight pattern or maneuver by the pilot, the damper resists the rate of change in tilt but once the tilt is stabilized or becomes fixed the damper means is no longer restraining the tilt. The hub remains parallel with the plane swept by the blades although it may be tilted with respect to the pylon. If now the hub should oscillate with respect to the pylon 10 the damper restrains this oscillation. The movement of the damper piston 36 downwardly within the cylinder 35 forces fluid through the connection 43 to the actuator 44 to compress or contract the actuator piston 46 and move the cylinder or casing 45 to the left which inserts a corrective increment into the swash plate. Upward movement of the piston 36 reverses this operation. Both movements introduce a delayed signal to the swash plate to feather the blades of the rotor in such manner to shift the rotor thrust vector and damp the oscillations. With an increase in oscillations of the hub the damping action increases.

A similar damping mechanism may be connected with a gimbal ring on the longitudinal or fore and aft axis of the rotor gimbal joint and connected into the linkage between pilot stick and the swash plate on its fore and aft axis. The connection would be with the outer ring of the gimbal if the lateral pivot is between the inner and outer ring. If the lateral pivot is between the pylon and the inner ring, the connection may be with either ring. The damper means 35A illustrates the location of this second damping mechanism with respect to the gimbal joint and its cooperating actuator is connected into the linkage 50a and 53a to the fore and aft position on the swash plate.

The resilient corrugated cylinder 39 performs the functions of closing the open end of the damper cylinder 35. This corrugated cylinder provides an approximately constant volume construction for the closed chamber of the fluid damper in all positions of the piston 36 so that vacuum or air pressure effects are not present therein.

The preferred construction of damping mechanism includes the fluid dashpot 35 and the sylphon 44 which is connected with the swashplate of the helicopter, however, damping effects are achieved by use of the dashpot 35 along with its interaction between the rotor hub and the fuselage by applying a corrective force in opposition to the pylon motion. This simpler damping mechanism is not as effective in its action as inserting a corrective impulse or signal into the swash plate.

This invention fills a need for improvements in a Damping Mechanism for the rotor hub of a helicopter for ground resonance and waddle and its combination with the rotor. Various modifications may and often do occur to those skilled in the art, especially after benefiting from the teachings herein. The preferred means of embodying the invention in useful form is disclosed.

What is claimed is:

1. A damping mechanism for damping the oscillations of the hub of a rotor head of a helicopter having a fixed point and a non-rotatable gimbal joint with rings for the hub and a linkage between a pilot stick and a swash plate comprising a fluid dashpot having a cylinder with closed ends, attaching means at one end of the cylinder, dashpot piston means including a dashpot piston slidable in the dashpot cylinder providing fluid restraint to piston movement and a dashpot piston rod extending through the other end of the dashpot cylinder and having ends, one end of the piston rod being secured to the dashpot piston, attaching means carried by the other end of the piston rod, spring means between the dashpot cylinder and the dashpot piston means providing spring restraint to movement of the dashpot piston means, the dashpot attaching means being suitable for attaching the dashpot between a ring of the gimbal joint and a fixed point on the helicopter, and the damping mechanism with its fluid damper and spring means connected in tandem providing a substantial delay between the oscillation of of the dashpot and the signal output of the dashpot.

2. A damping mechanism as in claim 1 in which the dashpot cylinder of the fluid dashpot has an open end including a combination means which includes the spring means and a closing cylinder secured to the dashpot piston rod and to the dashpot cylinder for closing the open end of the latter and centering the dashpot piston within the dashpot cylinder.

3. A damping mechanism as in claim 2 in which the closing cylinder is a corrugated resilient cylinder having an open end and a closed end with the open end secured to the open end of the dashpot cylinder to close the same and the closed end being secured to the dashpot piston rod.

4. A damping mechanism as in claim 1 including a fluid actuator having an actuator cylinder with ends, actuator piston means including an actuator piston movable within the actuator cylinder and an actuator piston rod extending through one end of the actuator cylinder and having ends with one end secured to the actuator piston, output attaching means carried by the other end of the actuator cylinder and suitable for connection in series or parallel with the linkage between the stick and the swash plate, a fluid connection between the dashpot cylinder and the actuator cylinder, and the damping mechanism providing about a 90° delay in the signal to the output attaching means.

5. A damping mechanism as in claim 4 in which the damper cylinder of the fluid dashpot has an open end including a combination means which includes the spring means and a closing cylinder secured to the damper piston rod and the damper cylinder closing the open end of the latter and centering the damper piston within the damper cylinder.

6. A damping mechanism as in claim 5 in which the closing cylinder is a corrugated resilient cylinder having an open end, a closed end with the open end secured to the open end of the damper cylinder to close the same and the closed end being secured to the damper piston rod.

7. A damping mechanism as in claim 4 in which the fluid actuator piston is a resilient corrugated sylphon cylinder having ends, one end of which is secured to the actuator piston rod and the other end being secured to the other end of the actuator cylinder from the end receiving the actuator piston rod.

8. A damping mechanism as in claim 7 in which the damper cylinder has an open end, and the spring means including a resilient corrugated cylinder having an open end and a closed end with the open end secured to the open end of the damper cylinder to close the same and the closed end being secured to the damper piston rod.

9. A damping mechanism as in claim 8 in which the sylphon cylinder is an airtight enclosure and evacuated to a pressure below atmospheric.

10. The combination of a helicopter rotor with the damping mechanism of claim 1 in which the helicopter has a longitudinal axis and a swash plate including a stationary gimbal joint having an outer ring and an inner ring, a rotor hub rotatably mounted on the outer ring, a plurality of blades each having a flexible spar and a longitudinal axis, means carried by the rotor hub mounting the blades thereon uniformly spaced angularly and mounting each blade for pitch change on its longitudinal axis, the gimbal joint having a lateral position with respect to the longitudinal axis of the helicopter, and the fluid damping means having one attaching means secured at a lateral position with respect to the helicopter axis to one of the gimbal rings and the other attaching means adapted to be secured to a fixed point on the helicopter.

11. A combination of a helicopter rotor as in claim 10 in which the dashpot cylinder has an open end, and the spring means is a corrugated resilient cylinder having an open end and a closed end with the open end secured to the open end of the dashpot cylinder to close the same and the closed end being secured to the dashpot piston rod.

12. A combination of a helicopter rotor with the damping mechanism of claim 4 in which the helicopter has a longitudinal axis and a swash plate including a stationary gimbal joint having an outer ring and an inner ring, a rotor hub rotatably mounted on the outer ring, a plurality of blades each having a flexible spar and a longitudinal axis, means carried by the rotor hub mounting the blades thereon uniformly spaced angularly and mounting each blade for pitch change on its longitudinal axis, the gimbal joint having a lateral position with respect to the longitudinal axis of the helicopter, and the fluid damping means having one attaching means secured at a lateral position with respect to the helicopter axis to one of the gimbal rings and the other attaching means adapted to be secured to a fixed point on the helicopter.

13. The combination as in claim 12 in which the damper cylinder of the fluid dashpot has an open end combination means including the spring means and a closing cylinder secured to the damper piston rod and the damping cylinder closing the open end of the latter and centering the damper piston within the damper cylinder.

14. The combination as in claim 13 in which the closing cylinder for the damping cylinder is a corrugated resilient cylinder having an open end and a closed end with the open end secured to the open end of the damper cylinder to close the same and the closed end being secured to the damper piston rod.

15. The combination as in claim 14 in which the fluid actuator piston is a resilient corrugated sylphon cylinder having ends, one end of which is secured to the actuator piston rod and the other end being secured to the other end of the actuator cylinder from the end receiving the actuator piston rod.

16. The combination as in claim 14 in which the damper cylinder has an open end, and the spring means including a resilient corrugated cylinder having an open end and a closed end with the open end secured to the open end of the damper cylinder to close the same and the closed end being secured to the damper piston rod.

17. The combination as in claim 12 including a swash plate having a lateral position with respect to the helicopter axis, a swash plate universal joint mounting the swash plate for tilting, and the cylinder attaching means for the fluid actuator being operatively connected with the lateral position of the swash plate.

18. The combination as in claim 12 including a second damper mechanism with its fluid damper connected with a movable gimbal ring of the gimbal joint at a fore and aft position thereof and the actuator of the mechanism adapted to be connected to the swash plate at a fore and aft position thereof.

* * * * *